United States Patent [19]

Grenga

[11] Patent Number: 5,059,636

[45] Date of Patent: Oct. 22, 1991

[54] TIRE SEALANT COMPOSITION

[76] Inventor: Paul A. Grenga, 327 Oak St., Youngstown, N.Y. 14174

[21] Appl. No.: 611,702

[22] Filed: Nov. 13, 1990

[51] Int. Cl.⁵ .................. B29C 73/16; C08L 3/00; C08K 3/16
[52] U.S. Cl. .................................. 523/166; 524/47; 524/436
[58] Field of Search ............... 524/47, 436; 523/166

[56] References Cited

U.S. PATENT DOCUMENTS

| | | | |
|---|---|---|---|
| 1,061,546 | 5/1913 | Kather | 523/166 |
| 2,357,650 | 9/1944 | Hall | 523/166 |
| 4,224,208 | 9/1980 | Kent | 523/166 |
| 4,337,322 | 6/1982 | Jaspon | 523/166 |

*Primary Examiner*—Paul R. Michl
*Assistant Examiner*—Peter Szekely
*Attorney, Agent, or Firm*—Wallace F. Neyerlin

[57] ABSTRACT

A non-petroleum based, environmentally safe tire sealant composition is prepared. The major ingredients in same are finely ground rubber, calcium chloride, all-purpose wheat flour and water. To these major ingredients are added a relatively small amount of sodium nitrite, and substantially smaller amounts of a vegetable oil and a de-foaming agent.

9 Claims, No Drawings

TIRE SEALANT COMPOSITION

BACKGROUND OF THE INVENTION

1. Field of the Invention

This invention relates to pneumatic tires and the problems of air loss due to the puncturing of same. More particularly, this invention relates to a composition for coating the inside of or for injection into inflatable tires so as to minimize and/or overcome the problems caused by such air loss or puncturing.

2. Description of Related Art

The problem of air loss due to the puncturing of air containing articles such as pneumatic tires has been long appreciated. A number of divergent approaches for sealing holes formed in the articles have been adopted. One of the earliest methods of repair, and as disclosed in U.S. Pat. No. 609,636, issued Aug. 23, 1898, involved the heating of a mixture of 24 parts of india-rubber, 3 parts of French chalk, 4 parts of wheat-meal and one part of glycerin to produce an elastic viscous sealant composition.

Another early patent, U.S. Pat. No. 1,061,316, issued 5/13/1913, teaches a sealant composition formulated from a heated mixture of 20 pounds of ground rubber, 7 gallons of water, 2 gallons of alcohol, 40 pounds of sugar, 10 pounds of glue, 1 pound of alum, and 3 pounds of flour or ground asbestos, or both.

A still later early patent, U.S. Pat. No. 1,444,288, issued 2/6/1923, teaches a sealant formulated from heated mixtures of a fluid binding agent, such as a rubber solution, and sugar, rice and waste sulphite-cellulose liquor.

U.S. Pat. No. 2,357,650, issued 9/5/1944, teaches the making of a sealant by heating a mixture of 12 parts starch, 60 parts glycerine, 55 parts water, 3 parts asbestos fiber, 8 parts salt and 11 parts of finely ground rubber. Ethylene glycol may be substituted for the glycerine.

U.S. Pat. No. 4,101,494, issued 7/18/1978, teaches the making of a tire sealant from a composition comprising asbestos fibers, fiberglass fibers, substantial amounts of polyvinyl alcohol and of water, together with several chemical additives.

U.S. Pat. No. 4,337,322, issued 6/29/1982 teaches the making of a sealant composition using the following ingredients: asbestos fiber, ethylene glycol monomer, polyethylene glycol, polyisoprene, process oil, detergent, sodium bicarbonate and water.

SUMMARY OF THE INVENTION

The present invention teaches the making of a tire sealant composition from a mixture of ingredients different from and novel over any of the sealant mixtures such as referred to and described above. The ingredients in the mixture taught are believed to be easier to handle and more environmentally safe than many of the ingredients used in making the sealants of the prior art; and the resultant sealant also is believed to be dramatically more durable and easier to handle than most of the available commercial tire sealant products presently on the market.

The major ingredients used in the sealant composition of the present invention are finely ground rubber from old tire carcasses, calcium chloride, all purpose wheat flour and water. To these major ingredients are added a relatively small amount of sodium nitrite, and substantially smaller amounts of a vegetable oil and a de-foaming agent, all of which ingredients (or equivalents or substitutes therfor) are important to result in a composition having all of the properties desired to achieve the objects of this invention.

DESCRIPTION OF THE PREFERRED EMBODIMENTS

The invention may best be described by the following Examples which describe the ingredient materials and procedures used in making the sealant compositions of this invention, as well as representative proportions of said ingredients.

EXAMPLE 1

Three gallons by volume of a finely ground rubber dust (e.g. 24 mesh Tyler screen series) is placed in a mixing pail. Ten pounds of all-purpose wheat flour is then added, followed by 1 gallon by volume of calcium chloride and then 3 gallons of water which preferably has been pre-heated to about 180° F. This entire mixture is then blended until smooth; during or after which small amounts (less than 1% of each by weight of the total mixture) of vegetable oil, sodium nitrite and a non-toxic silicone emulsion defoaming agent are added. Finally the resulting mixture is strained through a $\frac{1}{4}'' \times \frac{1}{4}''$ screen into suitable containers. In this Example, the rubber comprises about 11% by weight of the total composition, the wheat flour about 8% by weight, the calcium chloride about 22% by weight, and the water about 59% by weight. It should also be appreciated that the order of the steps carried out is generally preferred but not critical in order to achieve the desired end sealant composition.

The foregoing proportions of the major ingredients of the sealant of the present invention are those that are preferred. It should be noted however that the proportions of each of these ingredients may be varied somewhat, such as by plus and minus 10% for example and satisfactory results still be obtained. For example the rubber may comprise from about 10 to about 12% by weight of the composition, the calcium chloride from about 20 to about 24% by weight of the composition etc.

The vegetable oil serves to emulsify the mixture, to keep the product and/or the ingredients in same from separating and also to preserve the inner liner of the tire. The silicone agent serves to defoam the mixture. The small amount of sodium nitrite used minimizes or takes away the corrosive effect of the calcium chloride and also serves as a rust inhibiting agent to prevent rust that might be caused by the composition should it come into contact with metal wheels covered by the tires into which tires the sealant compositions of this invention are incorporated. The calcium chloride serves to lower the freezing point of the sealant so that it remains operative at temperatures as low as 30 degrees below zero degrees Fahrenheit. It also functions as a preservative for the wheat flour to prevent it from rotting or getting moldy or mildewing. The sodium nitrite also functions as a co-preservative for the wheat flour.

EXAMPLE 2

Three hundred and thirty (330) gallons of room-temperature water (about 2706 pounds) were sprayed or pumped into a large tank. 1000 pounds of calcium chloride were mixed into the water and dissolved in same. This procedure resulted in the temperature of the solvent-solute blend being raised to about 110° F. Then 50 or 100 pound bags of all-purpose wheat flour were added until the desired viscosity of the blend was reached. In this Example 350 pounds of wheat flour were used to reach the desired viscosity but it should be noted that this quantity may typically vary between about 300 and about 400 pounds, depending upon the ambient temperature and humidity when a particular batch of sealant is made up. Next 500 pounds of finely ground rubber, (e.g. 24 mesh, Tyler screen), one gallon of vegetable oil, 40 pounds of sodium nitrite and 4 pounds of a non-toxic silicone emulsion defoamer (e.g. a trademaked material sold under the name Mazo DF210) were all added to the mixture; and then all ingredients were thoroughly mixed together over a period of two hours.

The resultant product was then ready for use as a tire-sealant possessing excellent properties, and from which several advantages are derived for the user of same.

One of its best advantages to the user is as a preventative maintenance means or device, i.e. to be pumped into the insides of tires before the tires are even used and/or before the tires suffer any punctures. In other words, one of the unique features of the composition is that it can seal punctures as they occur, thus preventing loss due to "down time." Obviously the composition can also be used to seal tire punctures after they occur.

Instructions for Use of the Sealant

The sealant is typically stored in 5 gallon substantially air-tight containers containing about 50 pounds of the sealant. The valve core is removed from the tire and a pump with a line from the sealant is attached to the tire valve. The desired quantity of sealant is then pumped into the tire as per amounts set forth in the Quantity Chart that follows as an Exhibit. The valve core is then replaced in the tire and the tire filled with the correct air pressure. The sealant container is then re-sealed and the pump thoroughly cleaned or flushed with water.

The sealant is especially designed for use in:

| | | |
|---|---|---|
| Farm Tractors | Garbage Hauler | Fork Lifts |
| Back Hoes | Fire Trucks | Dump Trucks |
| Earth Movers | ATVs | Trailers |
| Riding Lawn Mowers | Pay Loaders | Recreational Vehicles |
| Pick-Up Trucks | Industrial Tires | 4-Wheelers |
| Bicycles | Golf Carts | |

Unlike many other sealants on the market, the sealant of the present invention is non-petroleum based and environmentally safe.

The sealant is useful as a problem solver, in that it seals punctures up to ¼ inch in diameter, stops slow leaks due to rubber porosity and seals rim and bead leaks.

It is highly beneficial in that it is simple to apply, provides instant results and that it lasts as long as a sealant as the tire it's installed in.

It is also economical in that it eliminates costly service calls, and "down time", lengthens the life of the tire it's installed in and is reusable, provided it remains in an airtight, sealed container. Upon acquiring new tires, the sealant can be removed from the old tires and re-installed in the new ones.

Having thus described the invention it should be apparent that numerous modifications and adaptations and functional equivalents may be resorted to without departing from the scope and fair meaning of the instant application as described here and above and as claimed here and below.

EXHIBIT - QUANTITY CHART

| Tire Size | # Ounces |
|---|---|
| 4.10–3.50 × 4 | 16 |
| 4.00–4.80 × 8 | 16 |
| 5.70 × 8 | 16 |
| 00–6.90 × 9 | 16 |
| 7.50 × 10 | 32 |
| 5.30–4.80 × 12 | 32 |
| 7.00 × 12 | 48 |
| 16 × 8-7 | 48 |
| 21 × 12-8/22 × 11-8/ 18 × 950-8 | 48 |
| 25 × 12/13.5-9 | 48 |
| 22 × 11-10 | 48 |
| 23.5 × 8–11 | 48 |
| 11 × 15–16 | 40 |
| 8.25 × 15 | 40 |
| 7.50 × 16 | 32 |
| 7.50 × 17 | 40 |
| 7.50 × 20 | 40 |
| 8.25 × 20 | 40 |
| 10.00 × 20 | 48 |
| 11.00 × 20 | 48 |
| 14.00 × 20 | 80 |
| 10.00 × 22 | 56 |
| 11.00 × 22.5 | 48 |
| 16.50 × 22.5 | 104 |
| 18.00 × 22.5 | 112 |
| 11.00 × 24.5 | 64 |
| 13.00 × 24 | 80 |
| 14.9 × 24 | 104 |
| 16.9 × 24 | 128 |
| 17.5L × 24 | 144 |
| 15.5 × 25 | 144 |
| 17.5 × 25 | 144 |
| 20.5 × 25 | 176 |
| 23.5 × 25 | 208 |
| 26.5 × 25 | 256 |
| 29.5 × 25 | 288 |
| 14.9 × 28 | 128 |
| 16.9 × 28 | 320 |
| 29.5 × 29 | 192 |
| 18.00 × 33 | 240 |
| 21.00 × 35 | 240 |
| 16.9 × 38 | 432 |
| 30.00 × 40 | 560 |
| 36.00 × 40 | 832 |
| 44.5 × 45 | 352 |
| 18.00 × 49 | 496 |
| 36.00 × 51 | 720 |
| 37.50 × 51 | 768 |

NOTE: Amounts listed are approximate. In high-risk puncture areas, up to double quantities may be used.

I claim:

1. A composition for coating the inside of or for injection into inflatable tires, the composition consisting essentially of:
   (a) finely ground rubber from the tread area of old tires
   (b) calcium chloride,
   (c) all purpose wheat flour,
   (d) water,
   (e) sodium nitrite,
   (f) vegetable oil, and
   (g) a de-foaming agent 2. A composition according to claim 1 wherein the calcium chloride is present in substantially twice the amount by weight of the rubber, the water is present in an amount by weight of about 5.0 to 6.0 times the amount of rubber, the wheat flour is present in an amount by weight of about 0.6 to about 0.8 times the amount of rubber, the sodium nitrite is present in an amount of about of about 0.5 to about 1.0% by weight of the total composition, and the vegetable oil and the de-foaming agent are each present in amounts less than 0.5% by weight of the total composition.

3. A tire sealant composition consisting essentially of the following thoroughly mixed ingredients based upon 500 parts by weight of finely ground rubber:

| Finely ground rubber | 500 parts |
|---|---|
| Water | about 2706 parts |
| Calcium chloride | about 1000 parts |
| All purpose wheat flour | about 350 parts |
| Sodium nitrite | about 40 parts |
| De-foaming agent | about 4 parts |
| Vegetable oil | about 4 parts |

4. A tire sealant composition consisting essentially of the following thoroughly mixed ingredients based upon 500 parts by weight of finely ground rubber:

| Finely ground rubber | 500 parts |
|---|---|
| Water | between about 2400 and about 3000 parts |
| Calcium chloride | between about 900 and about 1100 parts |
| All purpose wheat flour | between about 300 and about 400 parts |
| Sodium nitrite | between about 36 and about 44 parts |
| Defoaming agent | between about 3 and about 5 parts |
| Vegetable oil | between about 3 and about 5 parts |

5. A composition according to claim 1 wherein the de-foaming agent is a silicone emulsion de-foaming agent.

6. A composition according to claim 2 wherein the de-foaming agent is a silicone emulsion de-foaming agent.

7. A composition according to claim 3 wherein the de-foaming agent is a silicone emulsion de-foaming agent.

8. A composition according to claim 4 wherein the de-foaming agent is a silicone emulsion de-foaming agent.

9. A process for the preparation of a composition for coating the inside of or for injection into inflatable tires, said composition being a blend of ingredients in the quantities indicated, or the proportional substantial equivalents thereof, comprising carrying out the following steps:

a. pump 330 gallons of water into a tank or mixing vessel;
  b. add 1000 pounds of calcium chloride to the water and mix until dissolved;
  c. then add 50 or 100 pounds bags of all purpose wheat flour to the water and calcium chloride to a total of between about 300 pounds to about 400 pounds of flour, depending upon the ambient temperature and humidity, until a desired viscosity is reached;
  d. then add to and thoroughly mix in 500 pounds of finely ground rubber;
  e. then add 1 gallon of vegetable oil, 40 pounds of sodium nitrite and 4 pounds of a silicone emulsion de-foaming agent; and then
  f. thoroughly mix all of the above ingredients for a period of about 2 hours.

* * * * *